Figure 1:
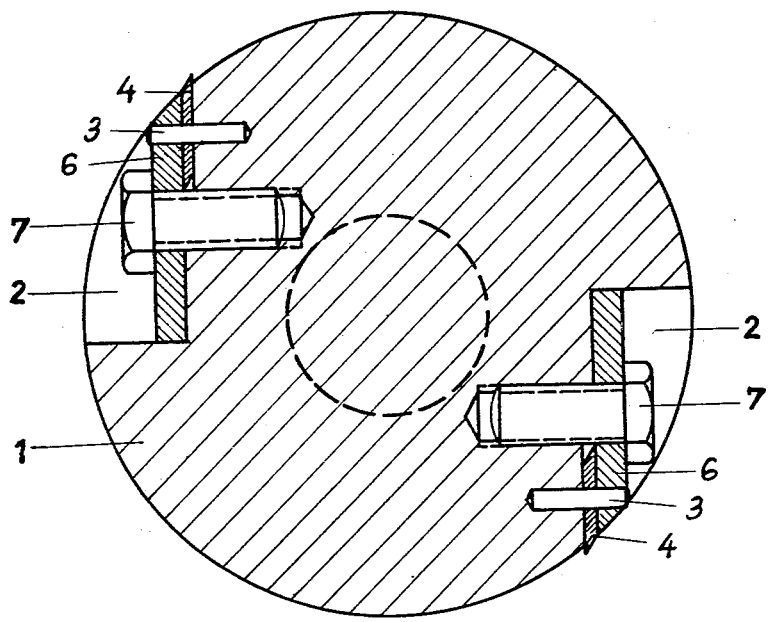

May 26, 1964 — A. SCHMITT — 3,134,412
CUTTER HEAD FOR WOODWORKING MACHINES
Filed April 3, 1962

INVENTOR
Adam Schmitt
By Lowry & Rinehart
ATTYS.

3,134,412
CUTTER HEAD FOR WOODWORKING MACHINES
Adam Schmitt, Falkenstein, Taunus, Germany
Filed Apr. 3, 1962, Ser. No. 184,797
1 Claim. (Cl. 144—230)

This invention relates to cutter heads, and more specifically to a cutter head for milling and other woodworking machines and to cutter shafts for planers.

The cutter shafts for planers mostly used in practice, merely convert the reciprocating movement of a hand planer into a rotating movement. Accordingly, elongated steel blades provided with a cutting edge on one side are in use, which are carried within recesses in a cutter shaft by means of clamping jaws or plates screwed to the cylinder. When the blades have become blunt they are reground and reinserted. Anyone skilled in the art has long been aware of the difficulties and dangers which are encountered in planers equipped with such cutter shafts and blades and which considerably increase with increasing working speed: The difficulty encountered in accurate regrinding despite the use of grinding machines and in readjusting the blades, which requires skilled workers; the unbalance of the cutter shafts which is easily caused by the regrinding of the blades and produces a loud working noise; the danger of the clamping attachment of the blades loosening during operation so that the blades are thrown out of the recesses in the cutter shaft, which has already resulted in numerous accidents.

Also in the case of milling heads and similar devices the conditions are not much different.

Numerous suggestions have therefore already been made to overcome these drawbacks individually, especially to improve and facilitate the grinding and inserting of the blades and to diminish the danger of the blades being thrown out. However, other drawbacks have been retained or were involved by the improvements. For example, it has become known to provide elongated holes in the blades extending transversely of the longitudinal direction of the blades and to pass the fastening screws of the clamping jaws through these elongated holes, the adjustment transversely of the fastening screws being made by means of adjusting screws. This measure, however, does not ensure that the adjusting screws will not loosen during operation and the blades will not shift. Moreover, regrinding is still necessary and unbalance of the cutter shaft will still occur.

To reduce the loud working noise, it has become known to give the blades a helical form and to insert them in helical grooves in the cutter shaft. This measure does, in fact, reduce the noise but the other above-described drawbacks remain and, moreover, manufacture of the blades is made more expensive due to the helical form.

It has already become known in the art to insert semi-annular flat blades side by side in helical grooves and to retain them in place by helically wound clamping members which are screwed to the shaft. These blades are not intended for regrinding but the difficulties of adjustment have not been overcome thereby. Moreover, the blades can only be ground after having been inserted in the cutter shaft. Furthermore, there is no safety against loosening of the clamping connection so that the danger of the blades being thrown out is particularly great. The fact that such blades can have one cutting edge only and the numerous screw connections of the complicated clamping members render such cutter shafts expensive in operation and manufacture.

It is the object of the present invention to overcome all the aforesaid drawbacks of the known cutter shafts simultaneously by utilizing the known advantages of very thin elastically flexible blades which are not intended to be reground.

The invention provides a cutter head for woodworking machines, which comprises a cutter shaft, diagrammatically opposed recesses provided in said cutter shaft, at least two fitting pins within each recess and sunk in said cutter shaft, a very thin, elastically flexible and removable blade with two rectilinear longitudinal cutting edges, not intended to be reground, and with at least two precision-made holes arranged on the longitudinal center line of said blade and engaged by the fitting pins of each recess, and means within each recess for clamping each blade in place.

The recess in which the blades are carried may be rectilinear or helical.

The means for clamping the blades in place comprise screws and clamping lips or pressure plates through which the screws project.

The fitting pins are expediently of such a length that they extend into precision-made holes provided in the clamping lips or pressure plates so as to immovably fix them.

The blades may also be provided with cutting edges at their end faces and mounted in the same manner in cutter heads for milling work.

Figure 2:
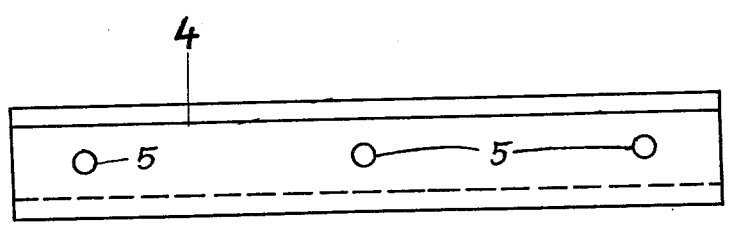

A preferred embodiment of the invention will now be described by way of example and with reference to the accompanying drawing, in which:

FIGS. 1 is a cross-section through a cutter head, according to the invention, and FIG. 2 is an elevational view of a blade with precision-made holes.

FIG. 1 shows a cutter shaft 1 in which diametrically opposed recesses 2 are provided. Within the recesses 2 fitting pins 3 are sunk in the cutter shaft 1 and carry very thin, elastically flexible and removable blades 4 which are provided with two rectilinear longitudinal cutting edges not intended to be reground. Corresponding to the number of the fitting pins 3 the blades 4 have on their longitudinal center line two or more precision-made holes 5. Pressure plates 6 are also mounted on the fitting pins 3 to firmly press the blades 4 against the cutter shaft 1 under the action of screws 7. The screws 7 may be provided with known locking means to prevent them from loosening self-actingly.

The recesses 2 in the cutter shaft 1 may also be helically formed since the thin blades 4 can readily be inserted helically. Insertion and inversion of the blades 4 can be carried out by unskilled workers since no adjustment is required. The cutting edge of a newly inserted blade 4 will exactly have over its entire length the required distance of 0.8 millimeter from the circumference of the cutter shaft 1. The occurrence of unbalance is excluded. The fitting pins 3 afford maximum safety against the blades 4 flying out of and receding into the recesses 2 in the cutter shaft 1. Thus, an increase of the number of revolutions of the cutter shaft up to 20,000 revolutions per minute is possible. Even at high speeds the revolving cutter shaft makes little noise. It has been found that the use of cutter shafts and blades according to the invention is by no means more expensive than the use of the known thick blades which must be reground.

The invention may be embodied in other specific forms without departing from the spirit or essential characteristics thereof. The present embodiment is therefore to be considered in all respects as illustrative and not restrictive, the scope of the invention being indicated by the appended claim rather than by the foregoing description and all changes which come within the meaning and range of equivalency of the claim are therefore intended to be embraced therein.

I claim:

A cutter head for woodworking machines, comprising
(a) a cutter shaft,
(b) diagrammatically opposed recesses provided in said cutter shaft,
(c) at least two fitting pins within each recess and sunk in said cutter shaft,
(d) a very thin, elastically flexible and removable blade with two rectilinear longitudinal cutting edges, not intended to be reground, and with at least two precision-made holes arranged on the longitudinal center line of said blade and engaged by the fitting pins of each recess, and
(e) means within each recess for clamping each blade in place comprising a pressure plate immovably fixed against sliding in a plane parallel to the blade by said fitting pins and an anchor screw passing through each pressure plate and entering a threaded socket in the cutter shaft.

References Cited in the file of this patent
UNITED STATES PATENTS

| | | |
|---|---|---|
| 275,890 | Cross | Apr. 17, 1883 |
| 1,620,847 | Whisler | Mar. 15, 1927 |

FOREIGN PATENTS

| | | |
|---|---|---|
| 199,324 | Great Britain | June 21, 1923 |